Nov. 24, 1964     W. W. GARDNER     3,158,415
EQUALIZING ARRANGEMENTS FOR TANDEM THRUST BEARINGS
Filed June 6, 1963     2 Sheets-Sheet 1
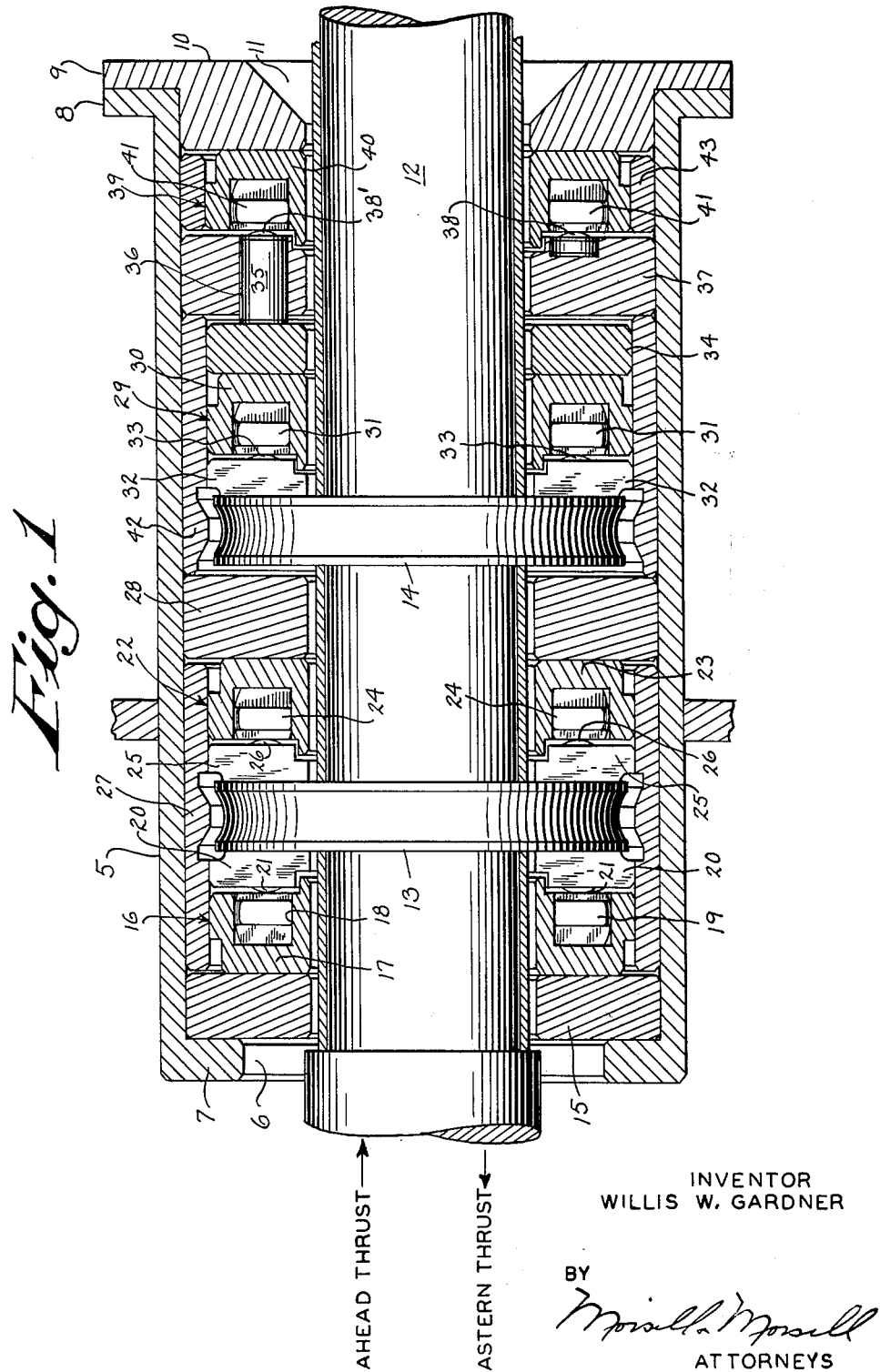
INVENTOR
WILLIS W. GARDNER
BY
ATTORNEYS Nov. 24, 1964  W. W. GARDNER  3,158,415
EQUALIZING ARRANGEMENTS FOR TANDEM THRUST BEARINGS
Filed June 6, 1963  2 Sheets-Sheet 2
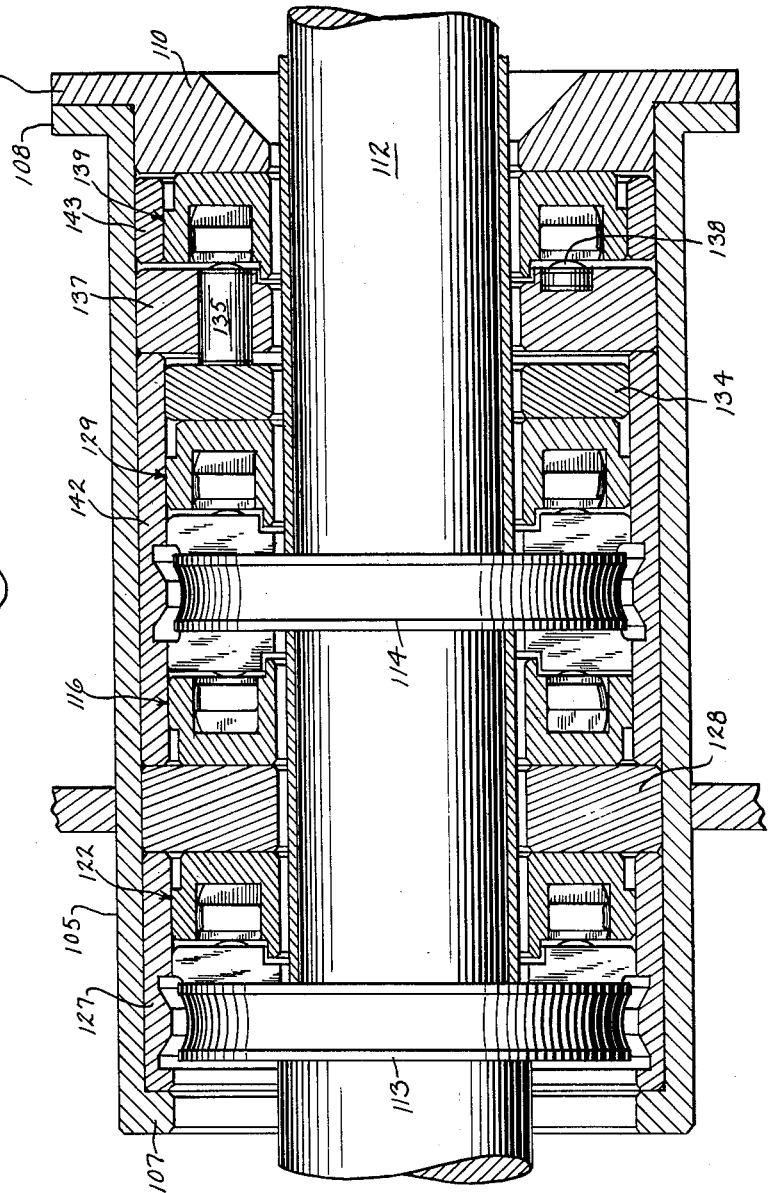
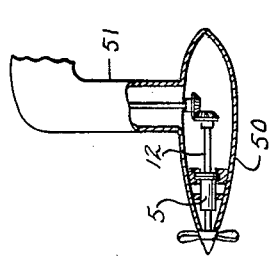
INVENTOR
WILLIS W. GARDNER
BY
*Morsell & Morsell*
ATTORNEYS

United States Patent Office 3,158,415
Patented Nov. 24, 1964

1

3,158,415
EQUALIZING ARRANGEMENTS FOR TANDEM
THRUST BEARINGS
Willis W. Gardner, New Berlin, Wis., assignor to Waukesha Bearings Corporation, Waukesha, Wis., a corporation of Wisconsin
Filed June 6, 1963, Ser. No. 285,926
9 Claims. (Cl. 308—160)

This invention relates to improvements in equalizing arrangements for tandem thrust bearings.

In certain uses of thrust bearings, size limitations make it necessary to use thrust bearings which are of small diameter. However, in many of these installations, a single thrust bearing of this size is not adequate for requirements. Because of this fact, it has heretofore been proposed to use tandem thrust bearings. One typical application is in a hydrofoil having an underwater pod which carries the propeller shaft. Here it is desirable to keep such pod of as small a diameter as possible to reduce drag. For this reason, any thrust bearing in the pod must be of small size with the result that a tandem thrust bearing for this type of application is very desirable. Tandem thrust bearings are also advantageous for other uses such as in compressors and turbines.

When tandem thrust bearings are employed there is the problem of proper distribution of the load between the bearings so that one does not take most of the load. Heretofore, several complicated arrangements have been proposed for distributing such loads. One of these arrangements is disclosed in Kingsbury Patent No. 1,117,499 and another in Howarth Patent No. 1,459,468, where a relatively complicated lever or block arrangement is employed for equalization. It has also been proposed to use an hydraulic method of equalizing the load. The latter, however, presents seal problems to prevent loss of hydraulic fluid, and requires the use of an external hydraulic system.

It is a general object of the present invention to provide a relatively simple and effective arrangement for distributing the load between the plural bearings in a tandem thrust bearing, the present construction being a substantial improvement over the complicated and troublesome arrangements of the prior art.

A more specific object of the present invention is to provide an arrangement whereby the entire load of two thrust bearings is effectively transmitted to a third thrust bearing or common output element.

With the above and other objects in view, the invention consists of the improved equalizing arrangement for tandem thrust bearings and all of its parts and combinations, as set forth in the claims, and all equivalents thereof.

In the accompanying drawings, illustrating two embodiments of the invention;

FIG. 1 is a longitudinal sectional view through a thrust bearing, showing the preferred arrangement;

FIG. 2 is a similar view showing a modification; and

FIG. 3 is a diagrammatic view showing a use of one of the improved bearings in the pod of a hydrofoil.

Referring more particularly first to FIG. 1 of the drawings, the numeral 5 designates an outer housing preferably of circular cross section having an opening 6 at one end surrounded by an annular casing flange 7. At the opposite end of the housing there is an externally-projecting annular flange 8 against which the annular flange 9 of a backup plate 10 is seated, the plate 10 having a central shaft opening 11. Extending through the bearing is a shaft 12 such as the propeller shaft 12 in the pod 50 of a hydrofoil 51, as shown in FIG. 3. The shaft has two thrust collars 13 and 14 thereon, which collars are spaced a substantial distance apart.

2

Loosely surrounding the shaft is an astern backup plate 15 having its outer side seated against the annular housing flange 7. Between the backup plate 15 and the collar 13 is an astern thrust bearing unit 16 of the self-leveling type. This thrust bearing includes a base ring 17 which engages the inner face of the astern backup plate 15 and which has an annular recess 18 accommodating leveling links 19. Shoes 20 have thrust buttons 21 which are adapted to engage the leveling links 19. This thrust bearing unit may be of the general type shown in Gruber Patent No. 3,011,839, dated December 5, 1961. On the other side of the collar 13 is a similar thrust bearing unit 22 which faces in the opposite direction and which includes a base ring 23, leveling links 24, shoes 25, and thrust buttons 26. Surrounding the thrust bearing units 16 and 22 and loosely surrounding the collar 13 is a cylinder 27. Between the latter and the collar 14 is a supporting ring 28.

On the righthand side of the collar 14 is a thrust bearing unit 29 like the unit 22 and facing in the same direction. It comprises a base ring 30, leveling links 31, shoes 32, and thrust buttons 33. To the right of the thrust bearing unit 29 is a ring 34 which acts against slidable pins 35 slidable in openings 36 of a ring 37, the latter having thrust buttons 38 which alternate with the pins 35. For a six-shoe thrust bearing there are three of the pins 35 alternating with three thrust buttons 38. Surrounding the collar 14, thrust bearing unit 29 and ring 34, is a thrust transmitting cylinder 42, and surrounding the bearing unit 29 is a ring 43. The pins 35 have buttons 38'.

Located between the ring 37 and the backup plate 10 is a partial thrust bearing assembly 39 which includes a base ring 40 and leveling links 41. All spaces within the housing are filled with oil as is customary.

In use of the arrangement of FIG. 1, ahead thrust, acting in the direction indicated by the arrow, is transmitted by the collar 13 on the shaft 12 through the shoes 25, thrust buttons 26, and leveling links 24 to the base ring 23 of the thrust bearing unit 22. From the latter the thrust is transmitted to the ring 28 which acts through the thrust transmitting cylinder 42 to transmit the thrust through the latter to the ring 37. This thrust is transmitted by the thrust buttons 38 to the common output thrust bearing unit 39 which acts against the backup plate 10. The latter transmits the thrust to the hul of the ship, such as 51 (FIG. 3), or to the housing of whatever device it may be used in.

During such ahead thrust the second collar 14 acts against the shoes 32 and the latter transmit the thrust through the buttons 33 and leveling links 31 to the base ring 30 of the bearing unit 29. From the base ring the thrust is transmitted to the ring 34, and from the latter, through the slidable pins 35 to the thrust bearing unit 39. This makes it possible to have tandem loading of bearings of small diameter, and is an arrangement whereby the entire load of the two thrust bearings 22 and 29 is transmitted to a common thrust bearing 39 in an equalized manner.

With the structure of FIG. 1, when there is astern thrust, this is transmitted from the collar 13 to the shoes 20 and through the thrust bearing unit 16 to the astern backup plate 15. Thus, with the arrangement of FIG. 1, the astern thrust is not transmitted in tandem.

In the form of the invention of FIG. 2, like housing and shaft parts are designated by the same numerals applied in FIG. 1 in 100 series, and will not again be described in detail. In this form of the invention, a supporting ring 128 is located midway between the two thrust collars 113 and 114. Interposed between the thrust collar 113 and one side of the ring 128 is a thrust bearing unit 122, and interposed between the other side of the ring 128 and the thrust collar 114 is an astern thrust bearing unit 116. A thrust transmitting cylinder 142 surrounds the bearing unit 116 and loosely surrounds the collar 113.

On the righthand side of the collar 114 is a thrust bearing unit 129, and to the right of the latter is a ring 134. The latter acts on pins 135 of a ring 137 and, located between the latter and the backup plate 110, is a partial thrust bearing unit 139, the ring 137 having thrust buttons 138 for coaction with the leveling links of the thrust bearing unit 139. Surrounding the bearing units 122 and 129 and loosely surrounding the collar 114 is a thrust transmitting cylinder 142, and surrounding the thrust bearing 139 is a ring 143.

In use of the form of the invention shown in FIG. 2, the collar 113 transmits its ahead thrust through the thrust bearing unit 122 and ring 128 to one end of the cylinder 142. The latter acts on the ring 137 which, through its thrust buttons 138, transmits the thrust through the thrust bearing unit 139 to the backup plate 110. The other collar 114 acts through the thrust bearing unit 129, ring 134, and pins 135 to transmit its load to the thrust bearing unit 139. Thus, the load from the two collars 113 and 114 is transmitted through tandem bearings of small diameter to a common thrust bearing unit 139.

In the form of the invention of FIG. 2, the astern thrust is transmitted from the lefthand side of the collar 114 to the astern thrust bearing unit 116. This, in turn, acts on the ring 128 and cylinder 127 to transmit the astern thrust to the housing. The main difference between this structure and the structure of FIG. 1 is that, in the former, the astern thrust bearing 116 is located between the two collars 113 and 114, whereas in the construction of FIG. 1, the astern thrust bearing 16 is located at the left of collar 13, making a somewhat simpler arrangement where applicable.

It is apparent from the above that a relatively simple and fool-proof arrangement has been provided which makes it possible to have tandem loading of bearings of small diameter. This makes it suitable for use in locations where there are dimensional limitations such as in the pod 50 of the hydrofoil 51 of FIG. 3.

Although only two forms of the invention are shown and described, various changes and modifications may be made without departing from the spirit of the invention, and all of such changes are contemplated as may come within the scope of the claims.

What I claim is:

1. In a thrust bearing assemblage wherein there is a shaft subjected to end thrust having spaced thrust collars thereon, a first thrust bearing unit surrounding said shaft and positioned to be engaged by one of said collars in response to thrust in one direction, a second thrust bearing unit surrounding said shaft and positioned to be engaged by the other thrust collar in response to thrust in the same direction, a common output thrust bearing unit including a thrust transmitting ring having fixed thrust projections, means between said first thrust bearing unit and ring for transmitting thrust from said first thrust collar to said common output unit through said fixed thrust projections, movable thrust elements movably supported relative to said thrust transmitting ring and positioned to act on said common output thrust bearing unit, and means between said second thrust bearing unit and movable thrust elements for transmitting thrust from said second collar to said common output thrust bearing unit.

2. In a thrust bearing assemblage wherein there is a shaft subjected to end thrust having spaced thrust collars thereon, a first thrust bearing unit surrounding said shaft and positioned to be engaged by one of said collars in response to thrust in one direction, a second thrust bearing unit surrounding said shaft and positioned to be engaged by the other thrust collar in response to thrust in the same direction, a common output thrust bearing unit including a thrust transmitting ring having fixed thrust projections, means between said first thrust bearing unit and ring for transmitting thrust from said first thrust collar to said common output unit through said fixed through projections, movable thrust pins movably supported relative to said thrust transmitting ring and positioned to act on said common output thrust bearing unit, and means between said second thrust bearing unit and movable thrust pins for transmitting thrust from said second collar to said common output thrust bearing unit.

3. In a thrust bearing assemblage wherein there is a shaft subjected to end thrust having spaced thrust collars thereon, a first thrust bearing unit surrounding said shaft and positioned to be engaged by one of said collars in response to thrust in one direction, a second thrust bearing unit surrounding said shaft and positioned to be engaged by the other thrust collar in response to thrust in the same direction, a common output thrust bearing unit including a thrust transmitting ring having fixed thrust buttons, means between said first thrust bearing unit and ring including a thrust transmitting cylinder surrounding said last mentioned thrust collar and second thrust bearing unit for transmitting thrust from said first thrust collar to said common output unit through said fixed thrust buttons, movable thrust elements movably supported relative to said thrust transmitting ring and positioned to act on said common output thrust bearing unit, and means between said second thrust bearing unit and movable thrust elements for transmitting thrust from said second collar to said common output thrust bearing unit.

4. In a thrust bearing assemblage wherein there is a rotatable shaft subjected to end thrust having spaced thrust collars thereon, and wherein there is a housing for said collars through which said shaft extends, said housing having an end backup plate, a first thrust bearing unit surrounding said shaft within said housing and engaged by one of said collars in response to thrust in one direction, a second thrust bearing unit surrounding said shaft and positioned to be engaged by the other thrust collar in response to thrust in the same direction, a common output thrust bearing unit within the housing and against said end backup plate including a thrust transmitting ring having fixed thrust buttons, means between said first thrust bearing unit and ring for transmitting thrust from said first thrust collar to said common output unit through said fixed thrust buttons, movable thrust buttons movably supported relative to said thrust transmitting ring and positioned to act on said common output thrust bearing unit, and means between said second thrust bearing unit and movable thrust buttons for transmitting thrust from said second collar to said common output thrust bearing unit.

5. In a thrust bearing assemblage wherein there is a rotatable shaft subjected to end thrust having spaced thrust collars thereon, and wherein there is a housing for said collars through which said shaft extends, a first thrust bearing unit surrounding said shaft and positioned to be engaged by one of said collars in response to thrust in one direction, a second thrust bearing unit surrounding said shaft and positioned to be engaged by the other thrust collar in response to thrust in the same direction, a common output thrust bearing unit including a thrust transmitting ring having fixed thrust projections, means between said first thrust bearing unit and ring for transmitting thrust from said first thrust collar to said common output unit through said fixed thrust projections, movable thrust buttons movably supported relative to said thrust transmitting ring and positioned to act on said common output thrust bearing unit, means between said second thrust bearing unit and movable thrust buttons for transmitting thrust from said second collar to said common output thrust bearing unit, and means including an additional thrust bearing unit so positioned adjacent one of said collars as to transmit to said housing thrust which acts in a reverse direction from said first direction.

6. In a thrust bearing assemblage wherein there is a shaft subjected to ahead and astern thrust having spaced first and second thrust collars thereon and wherein there is a housing for said collars through which said shaft extends, said housing having an astern backup plate at one end and having an ahead backup plate at the opposite end, an astern thrust bearing unit surrounding said shaft and positioned between said astern backup plate and one side of said first collar, a plate loosely surrounding said shaft between said first and second thrust collars, a first ahead thrust bearing unit positioned between said first collar and one side of said plate, a second ahead thrust bearing unit surrounding said shaft on the side of said second collar which faces said ahead backup plate positioned to be engaged by said second collar in response to ahead thrust, a common output thrust bearing unit including a thrust transmitting ring having fixed thrust projections and located between said second ahead thrust bearing unit and said common output thrust bearing unit, means between said plate which is between said collars and said ring for transmitting ahead thrust from said first thrust collar to said common output unit through said fixed thrust projections, movable thrust transmitting members slidably supported relative to said thrust transmitting ring and positioned to act on said common output thrust bearing unit, and means between said second ahead thrust bearing unit and slidable thrust members for transmitting ahead thrust from said second collar to said common output thrust bearing unit, astern thrust being transmitted from said first thrust collar to said astern thrust bearing unit and astern backup plate.

7. In a thrust bearing assemblage wherein there is a shaft subjected to ahead and astern thrust and having spaced first and second thrust collars thereon, and wherein there is a housing for said collars through which said shaft extends, said housing having an astern backup plate at one end and having an ahead backup plate at the opposite end, an astern thrust bearing unit surrounding said shaft and positioned between said astern backup plate and one side of said first collar, a plate loosely surrounding said shaft between said first and second thrust collars, a first ahead thrust bearing unit positioned between said first collar and one side of said plate, a second ahead thrust bearing unit surrounding said shaft on the side of said second collar which faces said ahead backup plate positioned to be engaged by said second collar in response to ahead thrust, a common output thrust bearing unit including a thrust transmitting ring having fixed thrust projections located between said second ahead thrust bearing unit and said common output thrust bearing unit, means between said plate which is between said collars and said ring and including a slidable cylinder surrounding said second thrust collar and second ahead thrust bearing unit for transmitting ahead thrust from said first thrust collar to said common output unit through said fixed thrust projections, movable thrust transmitting pins slidably supported transversely through said thrust transmitting ring and positioned to act on said common output thrust bearing unit, and means between said second ahead thrust bearing unit and pins for transmitting ahead thrust from said second collar to said common output thrust bearing unit, astern thrust being transmitted from said first thrust transmitting collar to said astern thrust bearing unit and astern backup plate.

8. In a thrust bearing assemblage wherein there is a shaft subjected to ahead and astern thrust and having spaced first and second thrust collars thereon and wherein there is a housing for said collars through which said shaft extends, said housing having an ahead backup plate at one end, a plate loosely surrounding said shaft between said first and second thrust collars, a first ahead thrust bearing unit positioned between said plate and said first thrust collar, an astern thrust bearing unit surrounding said shaft and positioned between said second thrust collar and said plate, a second ahead thrust bearing unit surrounding said shaft and positioned on the other side of said second thrust collar, a common output thrust bearing unit including a thrust transmitting ring having fixed thrust projections, said common bearing unit being located to act on said ahead backup plate, means including movable thrust transmitting members slidably supported relative to said thrust transmitting ring and acting between the second ahead thrust bearing unit and said common output bearing unit for transmitting ahead thrust to the latter, means between said plate which is between the collars and said thrust transmitting ring for transmitting ahead thrust from said first ahead thrust bearing unit to said thrust transmitting ring, and means including said astern thrust bearing unit for transmitting astern thrust from said second thrust transmitting collar through said plate to said housing.

9. In a thrust bearing assemblage wherein there is a shaft subjected to ahead and astern thrust and having spaced first and second thrust collars thereon and wherein there is a housing for said collars through which said shaft extends, said housing having an ahead backup plate at one end, a plate loosely surrounding said shaft between said first and second thrust collars, a first ahead thrust bearing unit positioned between said plate and said first thrust collar, an astern thrust bearing unit surrounding said shaft and positioned between said second thrust collar and said plate, a second ahead thrust bearing unit surrounding said shaft and positioned on the other side of said second thrust collar, a common output thrust bearing unit including a thrust transmitting ring having fixed thrust projections and located to act on said ahead backup plate, means including movable thrust transmitting pins slidably extending through said thrust transmitting ring and acting between the second ahead thrust bearing unit and said common output bearing unit for transmitting ahead thrust to the latter, a cylinder between said plate which is between the collars and said thrust transmitting ring and slidably surrounding said astern thrust bearing unit, said second thrust collar and said second ahead thrust bearing unit for transmitting ahead thrust from said first ahead thrust bearing unit to said thrust transmitting ring, and a cylinder slidably surrounding said first collar and first ahead thrust bearing unit for transmitting astern thrust from said second thrust transmitting collar through said plate which is between the collars to said housing.

References Cited in the file of this patent

UNITED STATES PATENTS

| | | |
|---|---|---|
| 1,117,499 | Kingsbury | Nov. 17, 1914 |
| 1,459,468 | Howarth | June 19, 1923 |